Figure 1:
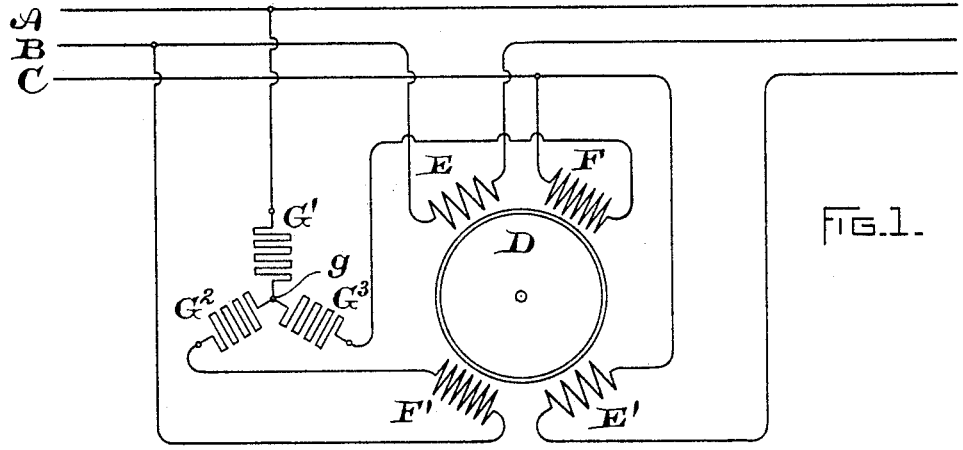

(No Model)

C. P. STEINMETZ.
THREE PHASE INDUCTION METER.

No. 583,950.　　　　　　　　　　Patented June 8, 1897.

WITNESSES:
A. H. Abell.
A. S. Macdonald.

INVENTOR,
Charles P. Steinmetz,
by Geo. R. Blodgett,
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

THREE-PHASE INDUCTION-METER.

SPECIFICATION forming part of Letters Patent No. 583,950, dated June 8, 1897.

Application filed January 30, 1897. Serial No. 621,319. (No model.)

*To all whom it may concern:*

Be it known that I, CHARLES P. STEINMETZ, a citizen of the United States, residing at Schenectady, in the county of Schenectady, State of New York, have invented certain new and useful Improvements in Three-Phase Induction-Meters, (Case No. 433,) of which the following is a specification.

My invention relates to alternating-current wattmeters of the induction type for measuring the energy of three-phase circuits. It is already known that two dynamometer wattmeters—for example, the well-known "Thomson" wattmeters—can be used to measure the total energy of a three-phase system by connecting their series coils in two of the main lines and their potential coils between the third line and the lines carrying the current-coils.

My invention aims to provide a wattmeter of the induction type which will likewise give a correct reading of the energy in three-phase three-wire interlinked systems, whether the load be balanced or unbalanced or whether or not the load be inductive in character.

My new meter consists of a closed secondary member of conducting metal, such as copper or aluminium, and for this part of the meter there may be used disks or cylinders such as are now common in other induction-meters. If such a secondary member is acted upon inductively by current-coils in two of the mains of a three-phase system and by potential coils included in the circuit of electromotive forces which are respectively in quadrature with the electromotive forces between the mains carrying the current-coils and the third main, there will likewise be secured a correct registration of the energy in the system, and this registration is secured by a single instrument rather than by meters having a number of motor mechanisms arranged in the different branches of the system. It is, however, not necessary that the potential coils be actually in circuit with electromotive forces in quadrature with the main-line electromotive forces, as pointed out, for the same result will be secured if the potential coils are so arranged and connected in circuit that the magnetisms set up thereby are the same or equivalent to magnetisms induced by potential coils connected in the particular manner already mentioned. For example, as will be explained more fully hereinafter, I may use two potential coils in circuit with electromotive forces in quadrature, or I may use coils of greater number in the circuit of electromotive forces of different phase relation, but so proportioned and arranged as to establish a resultant magnetism which is the equivalent of the magnetism of a single coil carrying a current of the theoretically proper phase relation. I therefore wish to include both arrangements within my invention, no matter whether the magnetisms due to the potential coils are produced by currents having the requisite phase relation or are produced by the combination of currents of other phase relation proportioned so as to give the proper resultant.

Figure 2:
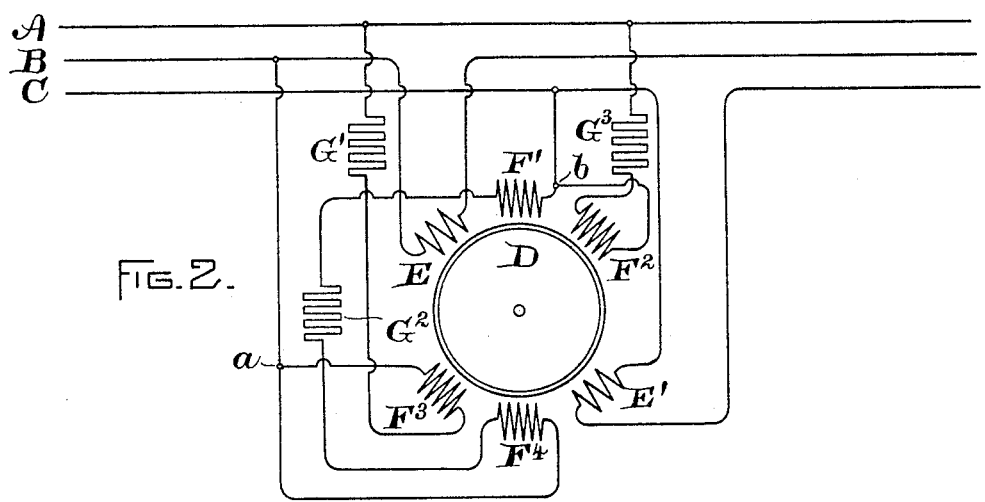
Figures 3, 4:
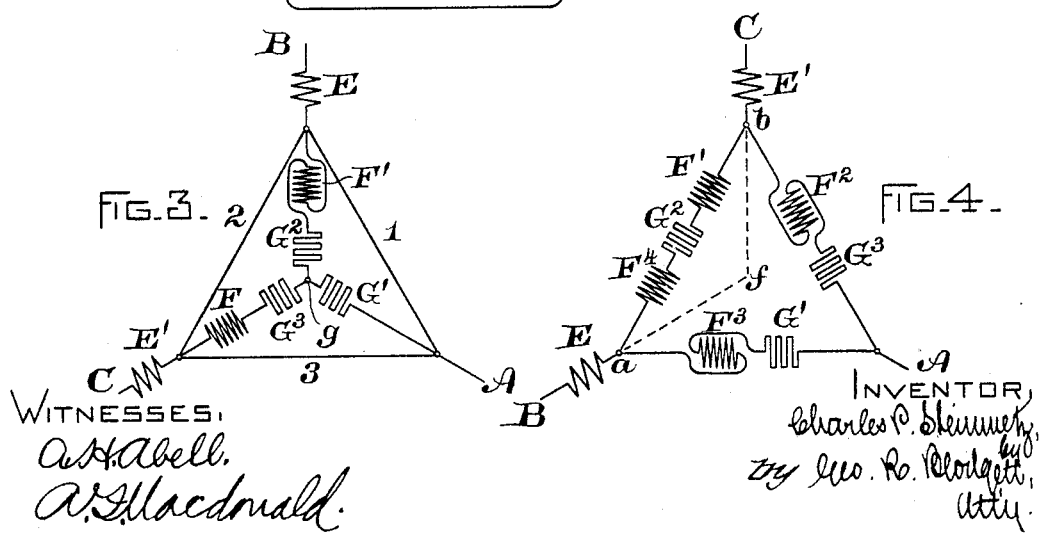

The accompanying drawings are diagrams showing the connections of three-phase meters made according to my invention, Figure 1 showing one form, and Fig. 2 a modified form. Fig. 3 is a diagram illustrating the connections and electromotive forces of the meter shown in Fig. 1, and Fig. 4 is a similar diagram explaining the operation of the meter of Fig. 2.

In Fig. 1, A B C are the three mains of the system. They may be interlinked at the generator in either of the usual ways—that is, by what is known as the "Y" or "delta" methods of connection. D is the drum or cylinder forming the rotating secondary element of the meter. E E' are current-coils included, respectively, in the mains B and C. F and F' are the potential coils. G' G² G³ are resistances having one set of terminals connected at a common joint $g$. The free terminal of resistance G' is connected to line A. The corresponding terminal of resistance G² is connected, through the potential coil F', to main B, and resistance G³ is similarly connected, through potential coil F, to main C. The value of these resistances is so chosen as to afford substantially equal resistance between the lines and common junction $g$, so that this point forms what is commonly called a "neutral point," which does not shift materially under different conditions of load. The resistances furthermore preserve the proper phase relation of the currents in the potential coils F F'.

Fig. 3 shows the connection of the coils and resistances in a convenient manner and also represents the electromotive forces which are present. Lines 1 2 3 are respectively the electromotive forces between the different mains A B C, these lines being drawn to form the equilateral triangle commonly used to diagram the electromotive forces in a three-phase system. The potential coil F and resistance $G^3$ are, as shown, in circuit between main C and the neutral point $g$, and the electromotive force between these points would be represented by a straight line from the angle at C to the neutral point $g$. This line is omitted in the diagram to avoid confusion. It is evident that this electromotive force will be in quadrature to the electromotive force between the mains A and B, (represented by line 1.) Similarly the electromotive force in the circuit between the main B and the neutral point $g$, which includes potential coil F', would be represented by a line drawn from the angle at B to the point $g$, and this electromotive force will be in quadrature to the electromotive force between lines A and C, (represented by the line 3.) Hence with this arrangement we have two series coils E and E', included, respectively, in the mains B and C, and by the resistances G' $G^2$ $G^3$ and the illustrated connections of the potential coils F and F' these potential coils are respectively included in circuits having electromotive forces in quadrature to the electromotive forces between the third main A and the mains B and C, carrying the current-coils. As already explained, these are the conditions under which, in accordance with my invention, an accurate registration of the energy in the system is secured by a single induction-meter. The potential coils F and F' are of course displaced around the secondary D a suitable angle from the current-coils.

In Fig. 2 another arrangement is illustrated for accomplishing the same result in a somewhat different way, but in a way giving equivalent effects so far as the operation of the meter is concerned, so that all such arrangements as this are to be included within the broader definitions of my invention hereinafter contained in the claims. The mains are represented at A B C, as before. A current-coil E is included in main B and a current-coil E' in main C, also as before. The potential coils are connected as follows: Main A is connected through resistance G' and potential coil $F^3$ to main B. Main A is also connected through resistance $G^3$ and potential coil $F^2$ to the main C, and there is a circuit from B to C, which may be traced from the point $a$ through potential coil $F^4$, resistance $G^2$, and potential coil F'. With this arrangement the action of the current-coils is the same as before, the difference between the two modifications being in the arrangement of the potential coils and resistances.

Fig. 4 shows very clearly the order in which these are connected between the different mains. Coils $F^3$ and $F^4$ will be wound together in the meter so as to have a common magnetic axis, and so also will coils F' and $F^2$. Coils $F^3$ and $F^4$, however, are in circuits whose electromotive force and currents will be displaced in phase, as indicated in the diagram, so that these coils will tend to induce magnetisms of displaced phase, but the magnetisms will combine, since the coils are wound together to form a resultant which may be indicated by the line $a\ f$. This line bears the same relation to the line connecting mains A and C as does in Fig. 3 the electromotive force in potential coil F to the electromotive force between mains A B, so that the magnetizing effect of the coils $F^3$ and $F^4$ may be regarded as the equivalent of the coil F in the arrangement of Fig. 3. Likewise the coils F' and $F^2$, which are in circuits of displaced phase, will combine to yield a resultant magnetism in the direction of the line $b\ f$, which is at right angles to the line representing the electromotive force between mains A and B. Therefore the same magnetic conditions are produced by the arrangement in Fig. 4 which are produced by the meter of Fig. 3, the coils $F^3$ and $F^4$ of Fig. 4 combining to do the work of coil F in Fig. 3 and coils F' and $F^2$ of Fig. 4 combining to do the work of coil F' in Fig. 3. The operation of this form of the invention will, therefore, be understood from the explanations already given.

What I claim as new, and desire to secure by Letters Patent of the United States, is—

1. A three-phase induction-wattmeter, comprising a closed-circuit armature and magnetizing-coils comprising current-coils in two of the main lines, and two potential coils or sets of coils in circuit with electromotive forces which are in quadrature with the electromotive forces between the third main and the two mains carrying current-coils, as described.

2. A three-phase induction-meter, comprising a closed-circuit armature, and primary magnetizing-coils comprising current-coils included in two of the main lines, and potential coils connected across the lines and arranged to afford magnetism in quadrature to the electromotive forces between the third main line and the two other main lines carrying current-coils, as described.

3. A three-phase induction-meter comprising a secondary member, current-coils in two of the main lines and establishing a magnetization proportional to the current in the system, potential coils connected across the lines and establishing a magnetization in quadrature to the electromotive forces between the third main and the mains carrying the current-coils.

4. A three-phase induction-meter, comprising a closed circuited secondary member, current-coils in two of the mains, resistances connected to the mains, and potential coils connected across the mains through the resistances so as to preserve the phase of the current in the potential coils and establish magnetization proportional to the potential on the system and in quadrature with the electromotive forces between the third main and the mains carrying current-coils.

5. A three-phase induction-meter, comprising a secondary member, current-coils connected in two of the mains, resistances connected between the mains and a neutral point, and potential coils connected between the mains carrying current-coils and the neutral point.

6. A three-phase meter comprising a closed-circuit secondary, current-coils in two of the mains, means for maintaining electromotive forces in quadrature between the mains carrying current-coils and the third main, and potential coils included in the circuits of such last-mentioned electromotive forces.

In witness whereof I have hereunto set my hand this 28th day of October, 1896.

CHARLES P. STEINMETZ.

Witnesses:
   B. B. HULL,
   M. H. EMERSON.